United States Patent [19]

Mix et al.

[11] 4,394,219

[45] Jul. 19, 1983

[54] FRACTIONATING LIQUIDS

[75] Inventors: Thomas W. Mix, Wellesley; Jay S. Dweck, Framingham, both of Mass.

[73] Assignee: Merix Corporation, Wellesley, Mass.

[21] Appl. No.: 287,035

[22] Filed: Jul. 27, 1981

Related U.S. Application Data

[63] Continuation-in-part of Ser. No. 161,880, Jun. 23, 1980, abandoned, which is a continuation of Ser. No. 45,839, Jun. 5, 1979, abandoned.

[51] Int. Cl.³ .............................................. B01D 3/42
[52] U.S. Cl. .............................. 203/1; 203/DIG. 18; 208/DIG. 1
[58] Field of Search ......... 208/356, 347, 354, DIG. 1; 203/77, 1–3, DIG. 18; 202/158, 160; 196/107, 134, 137, 139, 132; 62/21, 37

[56] References Cited

U.S. PATENT DOCUMENTS

| | | |
|---|---|---|
| 1,735,558 | 11/1929 | Youker . |
| 1,771,385 | 7/1930 | Subkow . |
| 1,820,573 | 8/1931 | Lyons . |
| 1,893,907 | 1/1933 | Primrose . |
| 1,954,839 | 4/1934 | Youker . |
| 2,652,129 | 9/1953 | Benedict . |
| 3,749,753 | 7/1973 | Skraba .................................. 203/88 |
| 4,167,475 | 9/1979 | Winter et al. ...................... 196/132 |

Primary Examiner—Frank Sever

[57] ABSTRACT

In fractionating tower apparatus including a plurality of modules including multi-stage segments, the improvement comprising the combination of a plurality of vaporizers for heating feed liquid to different temperatures to vaporize fractions of correspondingly different volatilities, means for feeding the vaporized fractions to different multi-stage segments of the tower, means for withdrawing liquid sidestreams from a plurality of the segments, temperature control means for limiting the level of heavy components in at least one selected liquid sidestream withdrawn from a segment below a module in which vapor is flashed, and means for separately feeding reflux liquid from at least one segment to a segment below it.

8 Claims, 3 Drawing Figures

FRACTIONATING LIQUIDS

BACKGROUND OF THE INVENTION

This application is a continuation-in-part of Mix et al. "Fractionating Liquids," Ser. No. 161,880, filed June 23, 1980, which in turn is a continuation of Mix et al. "Fractionating Liquids," Ser. No. 45,839, filed June 5, 1979, both now abandoned.

This invention relates to fractionating liquids, e.g., crude petroleum.

In a fractionating tower liquid is heated and vaporized to rise through the various stages of the tower. Eventually recondensation occurs, and fractions of different volatilities are drawn off as sidestreams from different stages of the tower. Although heat used for the original vaporization can be recovered upon re-condensation, recovery is at lower than the input temperature. An aspect of that temperature degradation (and of excessive use of energy) is that when liquid spanning a wide range of volatilities is vaporized at the bottom of the column, the more volatile fractions are heated to an unnecessarily high temperature.

In crude petroleum distillation systems light (i.e., volatile) fractions are sometimes flashed off separately before the main body of the crude enters the direct fired furnaces for the atmospheric column.

In Youker U.S. Pat. No. 1,954,839 staged flashing at different temperatures is used to introduce vapors of different volatilities at different stages of the fractionating tower.

In Lyons U.S. Pat. No. 1,820,573 staged flashing is similarly used, and separate condensers are used to recondense liquid at different stages of the tower.

SUMMARY OF THE INVENTION

The invention features improved fractionating tower apparatus including a plurality of modules including multi-stage segments. A plurality of vaporizers are provided for heating feed liquid to different temperatures to vaporize fractions of correspondingly different volatilities. The vaporized fractions are fed to different multi-stage segments of the tower, fractions of higher volatilities being fed to higher segments. Liquid sidestreams of desired products are withdrawn from a plurality of the segments. Temperature control means are provided for limiting the level of heavy components in at least one selected liquid sidestream withdrawn from a segment below a module in which vapor is flashed. Means are also provided for separately feeding reflux liquid from at least one segment to a segment below it.

In one preferred embodiment, the temperature control means includes means for limiting the temperature at which the vapor is flashed to below the temperature of the vapor in the tower whose composition most closely matches the flashed vapor.

In another preferred embodiment, the temperature control means includes means for limiting the temperature at which vapor is flashed to below the temperature of the lowest stage of the segment to which the flashed vapor is fed.

In still another preferred embodiment, the temperature control means includes means for limiting the temperature to which the vapor is flashed to below the temperature required to produce vapor whose heaviest two volume percent has a boiling point equal to the boiling point of the heaviest two volume percent of the next lower liquid sidestream.

The apparatus of the invention provides substantial energy savings while delivering sidestream products within industry limits for heavy molecule contamination.

Other advantages and features of the invention will be apparent from the following description of the preferred embodiments thereof, and from the claims.

DESCRIPTION OF PREFERRED EMBODIMENTS

We turn now to a description of preferred embodiments of the invention, after briefly describing the drawings.

Drawings

Embodiments

Figure 1:
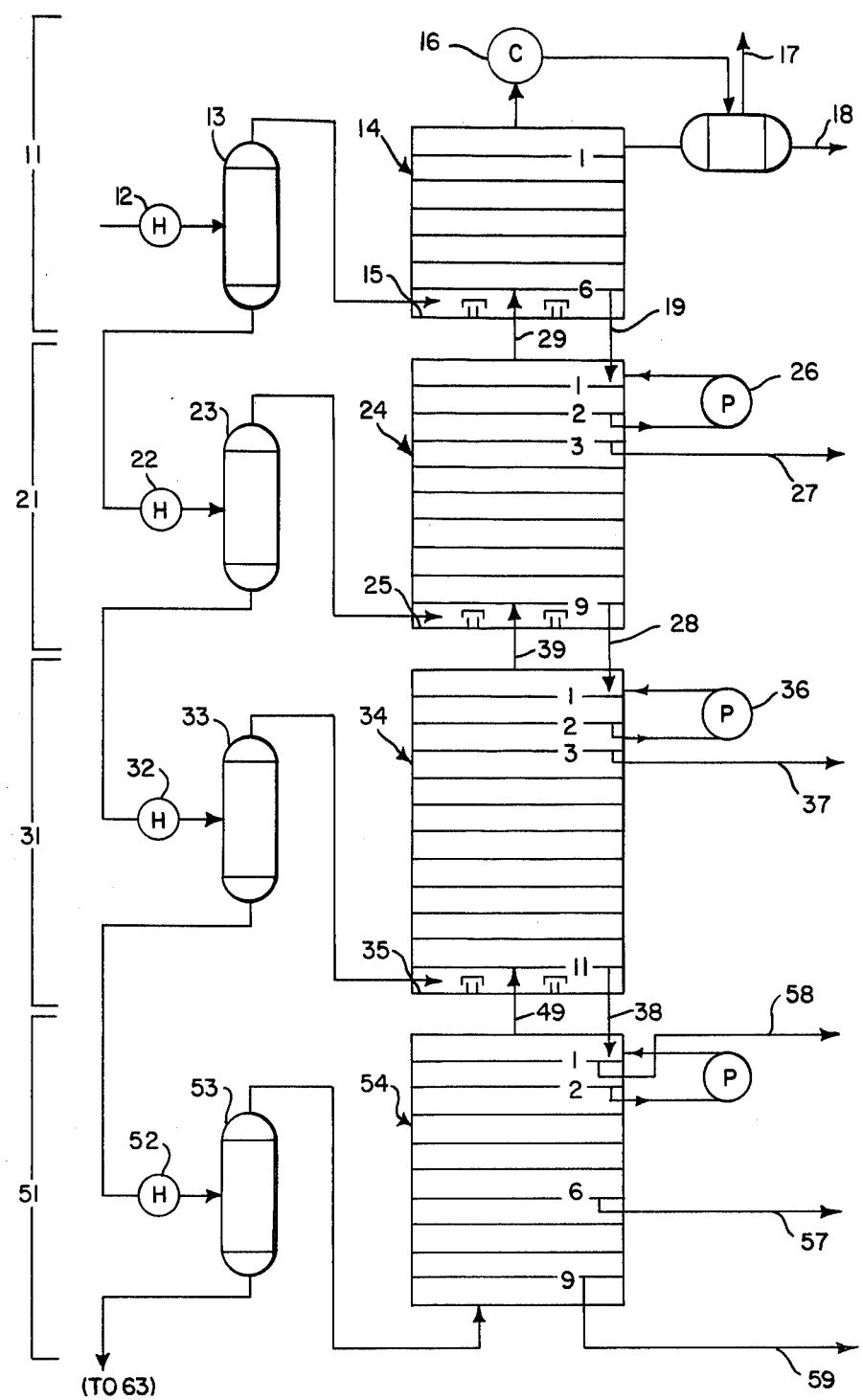
FIG. 1 is a semi-schematic view of an atmospheric tower embodying the invention.
Figure 2:
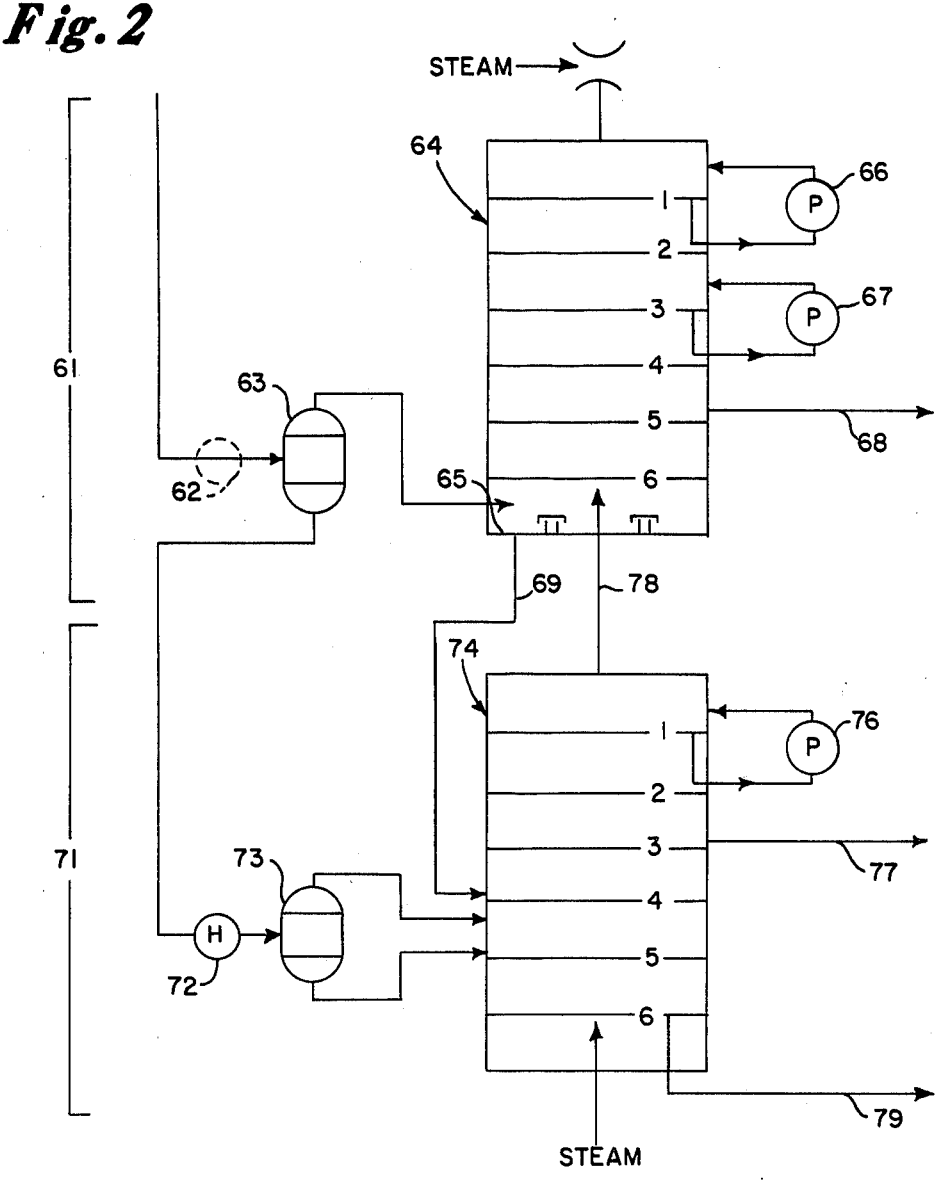
FIG. 2 is a semi-schematic view of a vacuum tower for use with the atmospheric tower of FIG. 1.

FIGS. 1 and 2 illustrate a sequential flash fractionating tower in which the temperatures within selected vaporizers are controlled to control the levels of heavy components appearing in lower sidestream products. The operation of the tower produces naphtha, kerosene, diesel, and higher boiling products from Arabian Light crude petroleum having a Watson K=11.65 and an API gravity of 33.5.

The apparatus shown in FIGS. 1 and 2 controls the levels of heavy components in selected sidestream products via temperature control means including heaters and vaporizers. This approach to heavy component control is in part based on the fact that vapor flashed at a given temperature contains components having boiling points considerably higher than that temperature. This occurs because the vaporization of lower boiling point components creates a vapor space in the vaporizer with which higher boiling point liquid components are in equilibrium; this causes the vaporization of some of those components at temperatures well below their boiling points.

Referring to FIGS. 1 and 2, the crude petroleum enters feed heater 12, associated with flash drum vaporizer 13, of the first module 11 of the atmospheric column 10. Under a pressure of 120 psia, the feed is heated to 390° F. and then fed to flash drum 13, where the temperature drops to 366° F. and the pressure is reduced to 26.35 psia. The vapor is flashed off and fed to the base of fractionating column segment 14 above total liquid drawoff tray 15. The vapors in tray are at a temperature of 441° F. The liquid leaving the bottom of flash drum 13 is pressurized by a pump (not shown) and fed to feed heater 22 of the second module 21 of the atmospheric column 10, where it is heated to 571° F. The heated liquid is fed to flash drum 23, where the pressure is reduced to 27.50 psia, and the vapor is flashed off; the temperature at this point has dropped to 543° F. The vapor is fed to the bottom stage of fractionating tower segment 24, above total liquid drawoff tray 25.

The liquid leaving flash drum 23 is pressurized by a pump (not shown) and fed to feed heater 32 of the third module 31 of the atmospheric column 10, where it is heated to a temperature of 680° F., the maximum temperature to which the liquid may be heated in the atmospheric column's direct-fired heaters without excessive cracking occurring. The liquid leaving heater 32 is fed to flash drum 33 where the pressure is reduced to 28.65 psia and vapor is flashed off and fed to the base of fractionating tower segment 34 above total liquid drawoff tray 35. The liquid leaving flash drum 33 is fed to flash drum 53 of the fourth module 51 of atmospheric column 10, where the pressure is reduced to 5 psia and vapor is flashed off and fed to the base of fractionating tower segment 54.

Referring now to FIG. 2, the liquid leaving flash drum 53 is fed to flash drum 63 of the first module 61 of the vacuum column 60, where the pressure is reduced to 2.4 psia and vapor is flashed off and fed to the base of fractionating tower segment 64 above total liquid drawoff tray 65. The liquid leaving flash drum 63 is pressurized by a pump (not shown) and fed to heater 72 of the second module 71 of the vacuum column 60, where the temperature is raised to 762° F. The stream leaving heater 72 is fed to flash drum 73 where the pressure is reduced to 0.58 psia and vapor is flashed off and fed to tray 4 of fractionating tower segment 74 of vacuum column 60.

Referring again to FIG. 1, vapor rising through fractionating tower segment 54 countercurrently contacts liquid flowing across and down the trays of this segment, and is totally condensed by pumparound 56 at the top of this segment. Sidestream 57 is drawn off from tray 6 of this segment, sidestream 58 is drawn off from tray 1 of this segment, and bottoms product 59 is drawn off from tray 9 of this segment. For heavy crudes in particular, it is sometimes desirable to feed sidestream 58 to a sidestripping column where lights can be stripped off and fed to the base of fractionating tower segment 34. Vapor 49 leaving the top of this segment is fed to fractionating tower segment 34 at its base through total liquid drawoff tray 35.

In fractionating tower segment 34, vapor rises countercurrently to liquid flowing across and down the trays of this segment, and is partially condensed by pumparound 36 located at the top of this segment. Sidestream 37 is drawn off from tray 3 of segment 34. Liquid 38 leaving the base of this segment from total liquid drawoff tray 35 is fed to tray 1 of fractionating tower segment 54. Vapor 39 leaving the top of this segment is fed to fractionating tower segment 24 at its base through total liquid drawoff tray 25. In fractionating tower segment 24, vapor rises countercurrently to liquid flowing across and down the trays of this segment and is partially condensed by pumparound 26 located at the top of this segment. Sidestream 27 is drawn off from tray 3 of this segment and fed to a sidestripper (not shown), where it is stripped of excess lights. Stripped vapors are fed to the base of fractionating tower segment 14 through total liquid drawoff tray 15. Liquid 28 leaving the base of this segment from total liquid drawoff tray 25 is fed to tray 1 of fractionating tower segment 34. Vapor 29 leaving the top of this segment is fed to the base of fractionating column segment 14 through total liquid drawoff tray 15. In fractionating tower segment 14, vapor rises countercurrently to liquid flowing across and down the trays of this segment and is partially condensed in overhead atmospheric condenser 16. The two-phase mixture leaving this condenser is separated in a phase separator from which distillate vapor 17 and distillate liquid 18 products are withdrawn, with the remaining liquid serving as reflux for the column. Liquid 19 leaving the base of this segment from total liquid drawoff tray 15 is fed to tray 1 of fractionating tower segment 24.

Referring again to the vacuum column of FIG. 2, steam can be supplied to the base of fractionating tower segment 74 to volatilize the necessary amount of material to produce the desired product recovery. Vapors rise through segment 74 countercurrently to liquid flowing across and down the trays of this segment and are partially condensed by pumparound 76 located at the top of this segment. Sidestream 77 is drawn from tray 3 of this segment and vacuum residuum 79 leaves the bottom tray of this segment. Vapor 78 leaving the top of this segment is fed to the base of fractionating tower segment 64 of vacuum column 60. The vapor rises through fractionating tower segment 64 countercurrently to liquid flowing across and down the trays of this segment and is partially condensed in the two pumparounds 66 and 67 located on trays 1 and 2 and on trays 3 and 4 of this segment. The top pumparound 66 cools the vapors leaving the column to 100° F. to reduce the amount of uncondensed hydrocarbon vapors in this overhead stream. The heat load of this upper pumparound 66 is relatively minor. Sidestream 68 is drawn from tray 5 of this segment but could also be drawn from tray 4. Uncondensed overhead vapors are fed to a three-stage steam jet ejector (not shown) to maintain the desired vacuum (5 mm Hg absolute pressure at the top of segment 64). Liquid 69 leaving the base of this segment from total liquid drawoff tray 65 is fed to tray 4 of fractionating tower segment 74. In the final module 71 of the vacuum column, the temperature to which the feed is heated is limited by cracking considerations, to 762° F.

The last module 51 of atmospheric column 10 (FIG. 1) and the first module 61 of vacuum column 60 (FIG. 2) employ pressure reductions and adiabatic flashes to achieve vaporization. The extent of the pressure reduction in the atmospheric column case is adjusted to give the desired amount of vaporization. In the vacuum column, the extent of the pressure reduction is determined by a balance between the increased vaporization resulting from the use of lower pressures and the higher column and ejector costs associated with lower operating pressures.

Referring to FIG. 1, liquid sidestream 27 is kerosene, which has an "end point" of 577° F.; i.e., the heaviest two volume percent has a boiling point of 577° F. The end point of the vapor flashed in vaporizer 13 is lower; 523° F. Similarly, the end point of diesel sidestream 37 is 726° F., and the end point of the vapor flashed in vaporizer 23 is lower; 722° F.

The vaporizing temperature in vaporizers 13 and 23 are also lower than the temperatures of the respective vapors in the tower which most closely match, in composition, the vapors in vaporizers 13 and 23.

The temperature control means, i.e., the heater together with the vaporizer, of modules 11 and 22 thus satisfy all three criteria of the three preferred temperature control means of the invention: the vapor is flashed at a temperature which is (1) lower than the temperature of the vapor in the tower whose composition most closely matches the composition of the flashed vapor; (2) lower than the temperature of the vapor in the lowest stage of the segment to which the flashed vapor is fed; and (3) lower than the temperature required to produce vapor whose heaviest two volume percent has a boiling point equal to the boiling point of the heaviest two volume percent of the next lower liquid sidestream.

Figure 3:
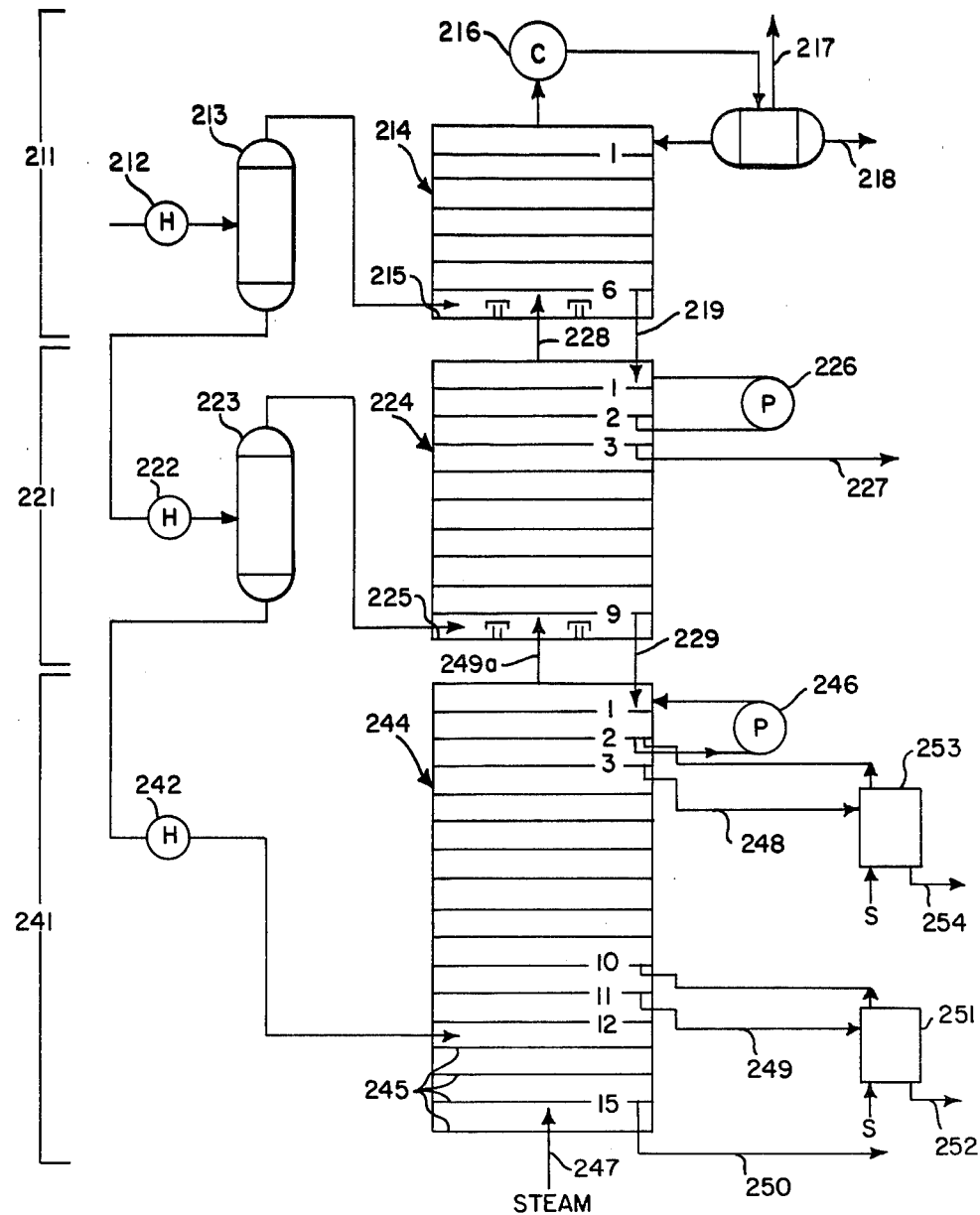
FIG. 3 is a semi-schematic view of an atmospheric tower embodying an alternate embodiment of the invention.

In the embodiment of FIG. 3, Arabian Light crude petroleum (as described with reference to FIGS. 1 and 2) enters feed heater 212 of the first module 211 of atmospheric column 210, where it is heated, under a pressure of 120 psia, to 390° F. The feed then enters flash drum 213, where the pressure is reduced to 26.35 psia and the vapor is flashed off at the controlled temperature of 365° F. and fed to the base of fractionating column segment 214, containing higher-temperature vapors. The liquid leaving flash drum 213 is pressurized by a pump (not shown) and fed to feed heater 222 of the second module 221 of the atmospheric column 210, where it is heated to 571° F. The liquid leaving heater 222 is fed to flash drum 223, where the pressure is reduced to 27.50 psia and the vapor is flashed off at the controlled temperature of 543° F. and fed to the base of fractionating tower segment 224, containing higher-temperature vapors. The liquid leaving flash drum 223 is pressurized by a pump (not shown) and fed to feed heater 232 of the third module 231 of the atmospheric column 210 where it is heated to 680° F. The liquid and vapor leaving this heater are flashed into fractionating tower segment 244 above steam stripping trays 245 where the pressure is 28.65 psia. Vapor is flashed off and rises up the column while the liquid flows across and down the stripping trays countercurrent to stripping steam 247.

Referring again to FIG. 3, vapor rising through bottom fractionating tower segment 244 countercurrently contacts liquid flowing across and down the trays of this segment and is partially condensed by pumparound 246 at the top of this segment. Sidestream 248 is drawn off from tray 3 of this segment and sidestream 249 is drawn off from tray 11 of this segment. Reduced crude 250, pressurized by a pump (not shown), leaves the bottom of segment 244 and is fed to feed heater 62 of the first module 61 of vacuum column 60 of FIG. 2. Sidestream 249 is fed to stripping column 251 where it is stripped of lights with steam and the vapors returned to the column at tray 10 of segment 244. Product 252 leaves sidestripper 251. Sidestream 248 can be steam-stripped in a sidestream steam stripper as well, in which case the stripped vapors are returned to tray 2 of segment 244, and product 254 leaves sidestripper 253. This steamstripping of sidestream 248 is particularly desirable in the fractionation of heavy crudes.

Vapor 249A leaving segment 244 enters the base of fractionating tower segment 224 through total liquid drawoff tray 225. In fractionating tower segment 224, vapor rises countercurrently to liquid flowing across and down the trays of this segment and is partially condensed by pumparound 226 located at the top of this segment. Sidestream 227 is drawn off from tray 3 of this segment and fed to a sidestripper (not shown) where it is stripped of excess lights. Stripped vapors are fed to the base of fractionating tower segment 214 through total liquid drawoff tray 215. Liquid 229 leaving the base of this segment from total liquid drawoff tray 225 is fed to tray 1 of fractionating tower segment 244. Vapor 228 leaving the top of this segment is fed to the base of fractionating column segment 214 through total liquid drawoff tray 215. In segment 214, vapor rises countercurrently to liquid flowing across and down the trays of this segment and is partially condensed in a two-stage overhead condenser. The two-phase mixture leaving the top condenser stage is separated in a phase separator from which distillate vapor 217 and distillate liquid 218 products are withdrawn. The bottom condenser stage provides liquid reflux for the column and some liquid product as well. Liquid 219 leaving the base of this segment from total liquid drawoff tray 215 is fed to tray 1 of fractionating tower segment 224.

One of the advantages of the embodiments of FIGS. 1 and 3 is that staged heating and flashing avoids heating the more volatile components of the feed to unnecessarily high temperatures. Heat can thus be recovered at the various pumparounds at temperatures relatively close to the temperatures at the corresponding feed heaters, and less fuel is required for the direct fired heater. Staging also reduces vapor flow, and hence column diameter, requirements. Moreover, the rough fractionation provided by the staged heating and flashing minimizes the presence of inappropriately volatile components in the lower sidestreams, which therefore need not be further stripped.

The use of low pressure (instead of steam) in segment 54 of the embodiment of FIG. 1 to volatilize heavier components increases the partial pressure of the condensing vapors, and the temperatures at which they condense, in the upper four segments of column 10.

On the other hand, in the embodiment of FIG. 3, the steam reduces the partial pressure of the hydrocarbon vapors in the column and thereby increases the extent of hydrocarbon vaporization for a given column temperature. The steam in effect replaces the lighter hydrocarbon components which have been flashed off (but would still be present in a non-staged heating/flashing process). Since steam has a much lower molar specific heat than do the hydrocarbon vapors which have been flashed off, the energy absorbed in heating the steam up to the temperature of the column bottoms is significantly less than that which would be absorbed in a non-staged process in heating up the lighter components to direct fired heater temperatures. Since only relatively modest pressure steam is required (less than 50 psia), the heat of vaporization of the steam may be provided at relatively low temperatures where waste heat is in excess. The embodiment of FIG. 3 is particularly advantageous where a separate light naphtha product in not desired, and the top column temperatures are as a result relatively high (in excess of 250° F.).

Other embodiments are within the following claims.

We claim:

1. A method of fractionating feed liquid containing fractions having different volatilities, said method being carried out in fractionating tower apparatus including a plurality of multi-stage segments, heaters, and vaporizers, said method comprising heating said feed liquid, by means of said heaters and vaporizers, to different temperatures to flash vapor fractions of different volatilities, feeding said flashed vapor fractions to different multi-stage segments of said fractionating tower apparatus, fractions of higher volatilities being fed to higher segments, withdrawing liquid sidestreams from a plurality of said segments, separately feeding reflex liquid from at least one segment to a segment below it, and controlling the level of heavy components in at least one selected liquid sidestream withdrawn from a segment below a segment where vapor is flashed by limiting the temperature at which said vapor is flashed to below the temperature of the vapor in the tower whose composition most closely matches the composition of the flashed vapor.

2. A method of fractionating feed liquid containing fractions having different volatilities, said method being carried out in fractionating tower apparatus including a plurality of multi-stage segments, heaters, and vaporizers, said method comprising heating said feed liquid, by means of said heaters and vaporizers, to different temperatures to flash vapor fractions of different volatilities, feeding said flashed vapor fractions to different multi-stage segments of said fractionating tower apparatus, fractions of higher volatilities being fed to higher segments, withdrawing liquid sidestreams from a plurality of said segments, separately feeding reflex liquid from at least one segment to a segment below it, and controlling the level of heavy components in at least one selected liquid sidestream withdrawn from a segment below a segment where vapor is flashed by limiting the temperature at which said vapor is flashed to below the temperature of the vapor in the lowest stage of the segment to which said flashed vapor is fed.

3. A method of fractionating feed liquid containing fractions having different volatilities, said method being carried out in fractionating tower apparatus including a plurality of multi-stage segments, heaters, and vaporizers, said method comprising heating said feed liquid, by means of said heaters and vaporizers, to different temperatures to flash vapor fractions of different volatilities, feeding said flashed vapor fractions to different multi-stage segments of said fractionating tower apparatus, fractions of higher volatilities being fed to higher segments, withdrawing liquid sidestreams from a plurality of said segments, separately feeding reflex liquid from at least one segment to a segment below it, and controlling the level of heavy components in at least one selected liquid sidestream withdrawn from a segment below a segment where vapor is flashed by limiting the temperature at which said vapor is flashed to below the temperature required to produce vapor whose heaviest two volume percent has a boiling point equal to the boiling point of the heaviest two volume percent of the next lower liquid sidestream.

4. The method of any one of claims 1, 2, or 3 wherein the volatility of said reflex liquid generally matches the volatility of the liquid in the stage to which said reflex liquid is fed.

5. The method of any one of claims 1, 2, or 3, further comprising separately condensing vapor from a plurality of said segments to form condensed liquid comprising said reflex liquid.

6. The method of claim 5 wherein said vapor is condensed by liquid pumparounds in said segments.

7. The method of any one of claims 1, 2, or 3 wherein said fractionating tower apparatus comprises an atmospheric tower.

8. The method of claim 7 wherein the vaporizer associated with the lowest segment of said atmospheric tower comprises a source of steam.

* * * * *